(12) United States Patent
Singidi et al.

(10) Patent No.: US 11,216,349 B2
(45) Date of Patent: Jan. 4, 2022

(54) REACTIVE READ BASED ON METRICS TO SCREEN DEFECT PRONE MEMORY BLOCKS

(71) Applicant: Micron Technology, Inc., Boise, ID (US)

(72) Inventors: Harish Reddy Singidi, Fremont, CA (US); Vamsi Pavan Rayaprolu, San Jose, CA (US); Kishore Kumar Muchherla, Fremont, CA (US); Jianmin Huang, San Carlos, CA (US); Xiangang Luo, Fremont, CA (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 420 days.

(21) Appl. No.: 16/159,132

(22) Filed: Oct. 12, 2018

(65) Prior Publication Data
US 2020/0117557 A1  Apr. 16, 2020

(51) Int. Cl.
*G06F 11/20* (2006.01)
*G06F 3/06* (2006.01)
*G06F 11/10* (2006.01)

(52) U.S. Cl.
CPC .......... *G06F 11/2094* (2013.01); *G06F 3/064* (2013.01); *G06F 3/0619* (2013.01);
(Continued)

(58) Field of Classification Search
CPC .............. G06F 11/1068; G06F 11/1012; G06F 11/008; G06F 11/1044; G06F 11/1076;
(Continued)

(56) References Cited

U.S. PATENT DOCUMENTS 9,070,481 B1 * 6/2015 Ellis ..................... G06F 11/3409
9,146,821 B2    9/2015 Byom et al.
(Continued)

FOREIGN PATENT DOCUMENTS

KR    20080063466    7/2008
KR    20140123230    10/2014

OTHER PUBLICATIONS

"International Application Serial No. PCT US2019 054083, International Search Report dated Jan. 17, 2020", 3 pgs.
(Continued)

*Primary Examiner* — Jigar P Patel
(74) *Attorney, Agent, or Firm* — Schwegman Lundberg & Woessner, P.A.

(57) ABSTRACT

A variety of applications can include apparatus and/or methods to preemptively detect detect one memory blocks in a memory device and handle these memory blocks before they fail and trigger a data loss event. Metrics based on memory operations can be used to facilitate the examination of the memory blocks. One or more metrics associated with a memory operation on a block of memory can be tracked and a Z-score for each metric can be generated. In response to a comparison of a Z-score for a metric to a Z-score threshold for the metric, operations can be performed to control possible retirement of the memory block beginning with the comparison. Additional apparatus, systems, and methods are disclosed.

21 Claims, 7 Drawing Sheets

(52) U.S. Cl.
CPC .......... *G06F 3/0647* (2013.01); *G06F 3/0673* (2013.01); *G06F 11/1068* (2013.01); *G06F 2201/82* (2013.01)

(58) Field of Classification Search
CPC .... G06F 3/064; G06F 11/2094; G06F 3/0619; G06F 3/0647; G06F 3/0673; G06F 2201/82
See application file for complete search history.

(56) References Cited

U.S. PATENT DOCUMENTS

| | | | |
|---|---|---|---|
| 11,048,677 B1* | 6/2021 | Chandrashekar | ... H04L 67/1097 |
| 2012/0124273 A1 | 5/2012 | Goss et al. | |
| 2014/0254272 A1 | 9/2014 | Sharon et al. | |
| 2015/0378801 A1* | 12/2015 | Navon | ................ G11C 16/349 714/704 |
| 2016/0232983 A1* | 8/2016 | Khurana | ............. G11C 7/1006 |
| 2017/0294237 A1* | 10/2017 | Li | ........................... G11C 29/76 |
| 2019/0065302 A1* | 2/2019 | Cosgrove | ................ G06F 11/34 |

OTHER PUBLICATIONS

"International Application Serial No. PCT US2019 054083, Written Opinion dated Jan. 17, 2020", 4 pgs.
Bradner, Erin, "Parts of the SUM: a case study of usability benchmarking using the SUM Metric", Retrieved from the Internet:https: d2f99xcqvrilnk.cloudfront.net legacy_app_files pdf 2009%20Bradner%20Dawe%20SUM.pdf, on [retrieved on Jan. 9, 2020], (Jun. 8, 2012), 2-9.

* cited by examiner

REACTIVE READ BASED ON METRICS TO SCREEN DEFECT PRONE MEMORY BLOCKS

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each up as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate and can be referred to as a planar memory array. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having benefits over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

In the manufacture of electronic components, such as those mentioned above for example, there are manufacturing standards directed to the amount of defective parts per million (DPPM) allowable. DPPM requirements are getting stricter, that is, the number of allowable defects is tending to be reduced. Meeting these increasingly strict DPPM requirements will impact time to market. Defining stresses and screens to preemptively screen these defect prone blocks can also impact yields, because of stress and screen overkill. Further, process improvements to address the occurrence of defects, such as NAND defects, are a slow process.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
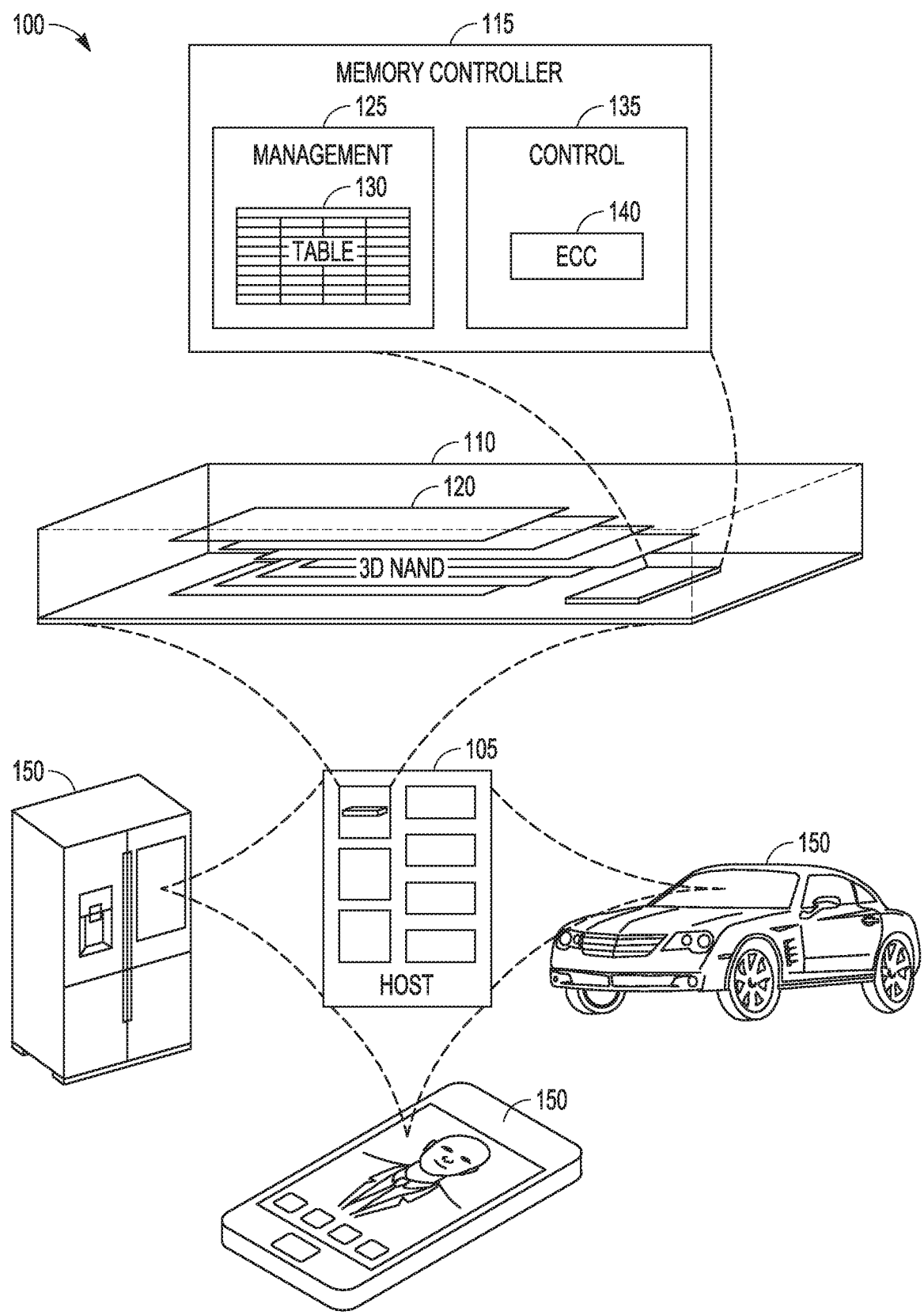
FIG. 1 illustrates an example of an environment including a memory device, according to various embodiments.

The following detailed description refers to the accompanying drawings that show, by way of illustration, various embodiments of the invention. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, metrics based on memory operations with respect to memory blocks can be used to preemptively detect defect prone memory blocks and handle these memory blocks before they fail and trigger a data loss event. The memory operations can include program, erase, and read operations. The metrics can be measurable events such as the time it takes to perform a specified memory operation. Examples of such measurable events as metrics include, but are not limited to, the time to program a page of a memory block (tPROG) and the time to erase a memory block (tBERS). A metric based approach to preemptively detect and handle defect prone blocks can use a Z-score tracking approach. Herein, a memory block can also be referred to as a block of memory.

A Z-score is defined as a ratio of the difference between a current sample value and a mean of the sample to a sigma of the sample. The Z-score can be written as Z-score=(Current Sample Value−Mean)/Sigma.

The mean of the sample is the average of a set of the sample values. In this metric based approach, the set is a set of previously measured values of the sample, where the current value of the sample used in the Z-score is not used in the calculation of the mean. The sigma of a sample is the standard deviation of the values of the sample, which can be represented by the Greek letter $\sigma$ or the Latin letter s. The standard deviation is a measure that is used to quantify the amount of variation or dispersion of a set of data values. A low standard deviation indicates that the data points tend to be close to the mean, which is also referred to as an expected value, of the set, while a high standard deviation indicates that the data points are spread out over a wider range of values. Similar to the mean, in the metric based approach, the sigma is based on the previously measured values of the sample, where the current value of the sample used in the Z-score is not used in the calculation of the sigma. In the metric based approach, a sample is a metric. For example, the tPROG is a metric that is a sample for which a Z-score can be generated. The tBERS is another metric that is a sample for which a Z-score can be generated.

In various embodiments, a system can keep track of multiple metrics for a memory device. In an example, a system can keep track of two different metrics, though the system is not limited to two different metrics. Two metrics that can be used are the tPROG and the tBERS. The mean and sigma values of these metrics are independent for each metric. The tBERS can be allocated in a distribution of measured times to erase a block according to a block type such as SLC or TLC. The tPROG can be allocated in a distribution of measured times to program a page in a memory block according to a block type such as SLC or TLC, page type, sub-block, access line (WL) group etc.

With respect to keeping track of metrics, for each metric, a system can keep track of a previous mean and a previous sigma. These previous statistics are used to generate a Z-score for the corresponding current value of the metric. A current value of a metric, in addition to the generation of a Z-score, can be used to generate a current mean and current sigma to update the statistics for the metric's mean and sigma. In a next measurement of the metric, the current mean and current sigma become the previous mean and the previous sigma for generation of a Z-score for the next measurement. For every X number of program and erase (PE) cycles, the current values can be copied over to be previous values after which the current values are reset to the values being measured. The X number of PE cycles can be set in the system by analysis of the collected data and the system can set the criteria for sample sizes to be collected to calculate the mean and the sigma for each respective metric. All Z-score calculations are based on the previous mean and sigma values relative to the current measured value.

At time zero or the beginning of system operation, the system can use previous mean and previous sigma values that are sourced from the memory device manufacturer, such as a NAND manufacturer, or a system manufacturer. The system manufacturer may be a memory system manufacturer such as a SSD manufacturer. The current mean and current sigma for each metric at time zero can be taken to be zero. A metric based approach to preemptively detect and handle defect prone blocks that generates a Z-score can compare the generated Z-score for a metric to a threshold for the Z-score for the metric. The Z-score_threshold for the metric can be set to a confidence limit at time zero. For example, the Z-score_threshold can be set to three sigma. Other values for Z-score_threshold can be used.

A different Z-score_threshold can be used for each different metric. For the tPROG metric, if the Z-score for the tPROG>the Z-score_threshold for tPROG (Z-score_shreshold_tPROG), then a read of the page, for which the Z-score for the tPROG was generated, can be conducted including determining a fail bit count. The fail bit count can be compared to a threshold for correctable error correcting code errors (CECC_threshold):

If the fail bit count>CECC_threshold, then the written valid data from this block can be relocated to another block and the block can be retired. In addition, the Z-score_threshold_tPROG can be changed in view of the comparison results.

If the fail bit count<CECC_threshold, then the current value for tPROG can be added to the previous values for tPROG to calculate a new mean and new sigma for tPROG. In addition, the Z-score_threshold_tPROG can be changed in view of the comparison results.

If the Z-score for the tPROG<Z-score_threshold_tPROG, programming of the block can continue.

For the tBERS metric, if the Z-score for the tBERS>the Z-score_threshold for tBERS (Z-score_threshold_tBERS), then, independent of tPROG, a block scan can be performed after the block is closed, including determining a fail bit count on each page of the memory block being read. The fail bit count can be compared to CECC_threshold:

If the fail bit count on any page>CECC_threshold, then valid data from this block can be relocated to another block and the block can be retired. In addition, the Z-score_threshold_tBERS can be changed in view of the comparison results.

If the fail bit count<CECC_threshold, then the current value for tBERS can be added to the previous values for tBERS to calculate a new mean and new sigma for tBERS. In addition, the Z-score_threshold_tBERS can be changed in view of the comparison.

For a given distribution, the Z-score of a sample (metric) be used to identify if a given measured value, which is a point in the distribution, is an outlier for the sample in the distribution. If |Z-score for tPROG|>Z-score_threshold_tPROG, the page corresponding to the tPROG can be marked for a follow up read. If the follow-up page read passes, then the current tPROG value can be added to the previous mean and sigma calculations to generate current mean and sigma calculations for tPROG. If |Z-score for tBERS|>Z-score_threshold_tBERS, the block corresponding to the tBERS can be marked for a follow up read. If the follow-up block read passes, then the current tBERS value can be added to the previous mean and sigma calculations to generate current mean and sigma calculations for tBERS. The newly calculated mean and sigma for each metric are used for future Z-score triggers for the respective metric. The Z-score value for a metric may be updated if too many values for the metric pass a certain Z-score_threshold for the metric. The level for too many values can be dynamically set in the system tracking the metrics.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., Internet-of-Things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory controller 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host device 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and four or more planes per device. As another example, a 32 GB MLC memory device (storing two bits of data per cell (i.e., four programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page; whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
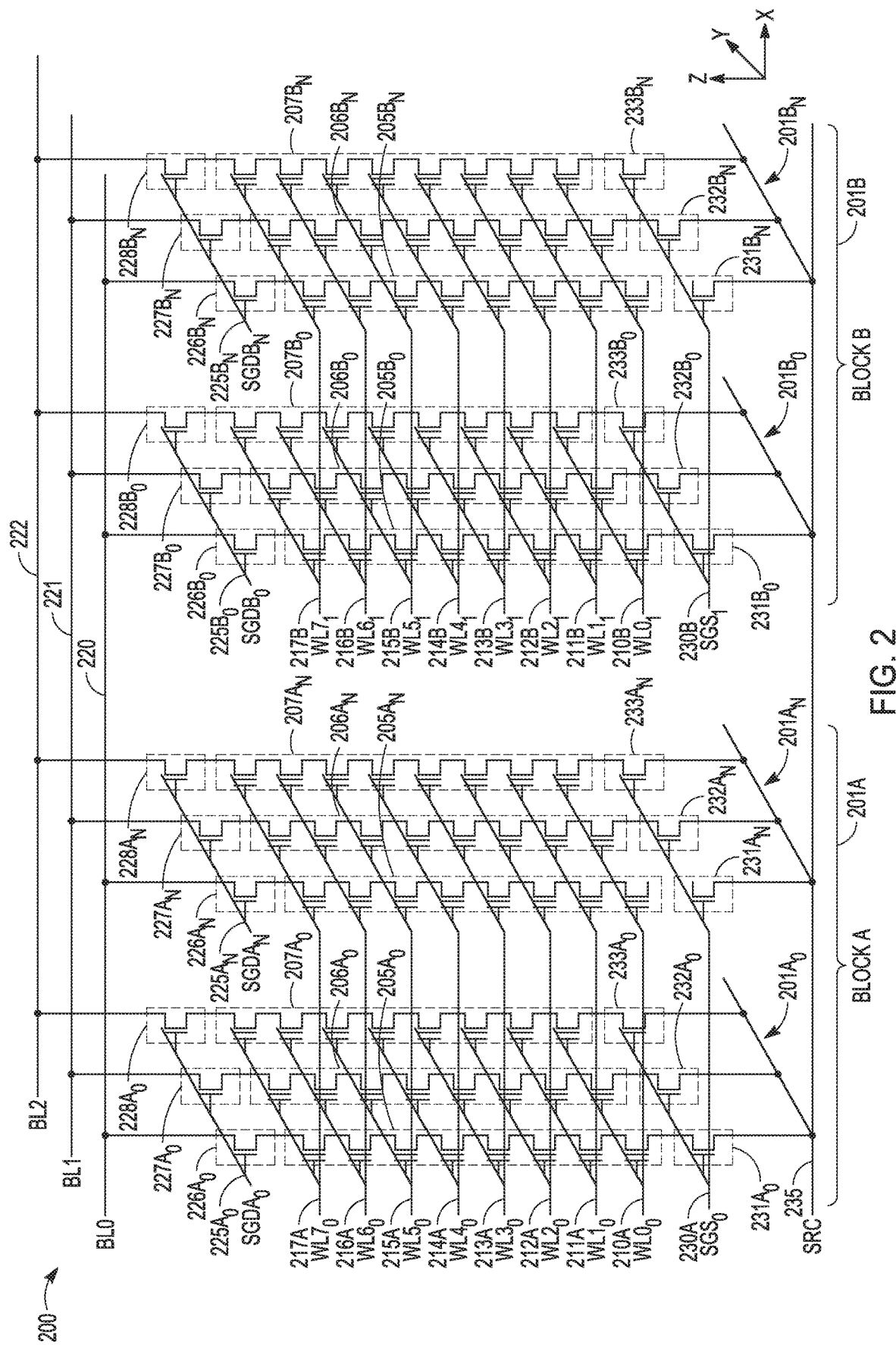
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and four or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array 200, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
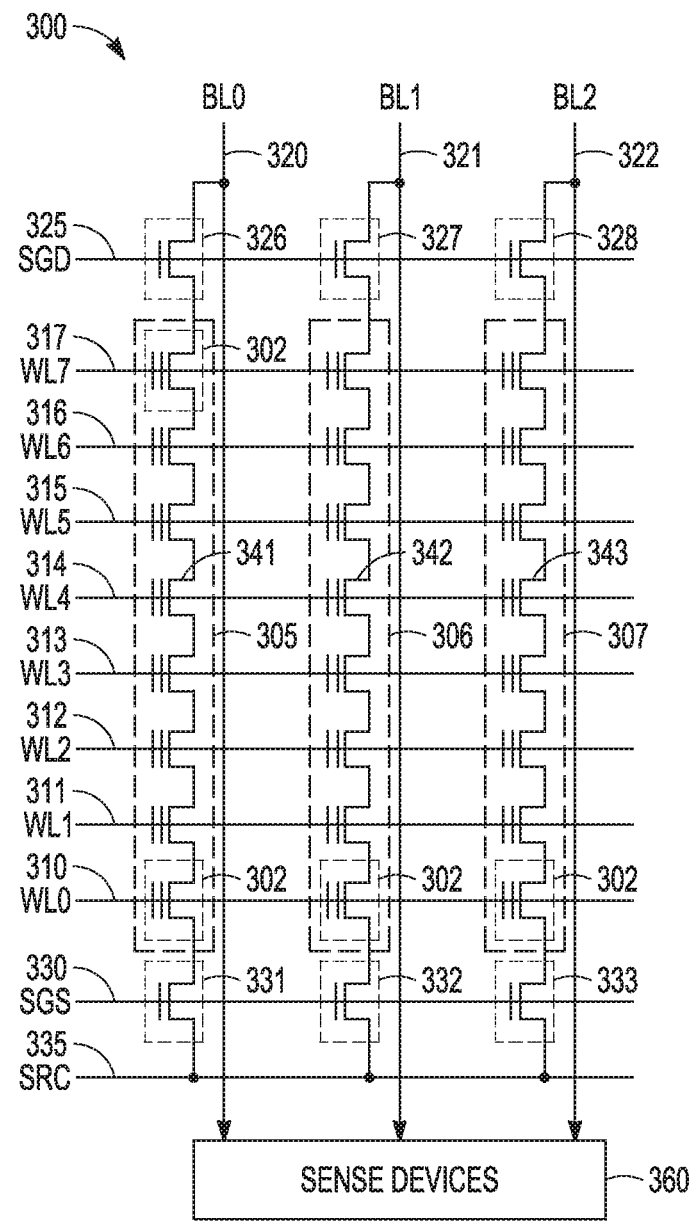

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers or devices 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
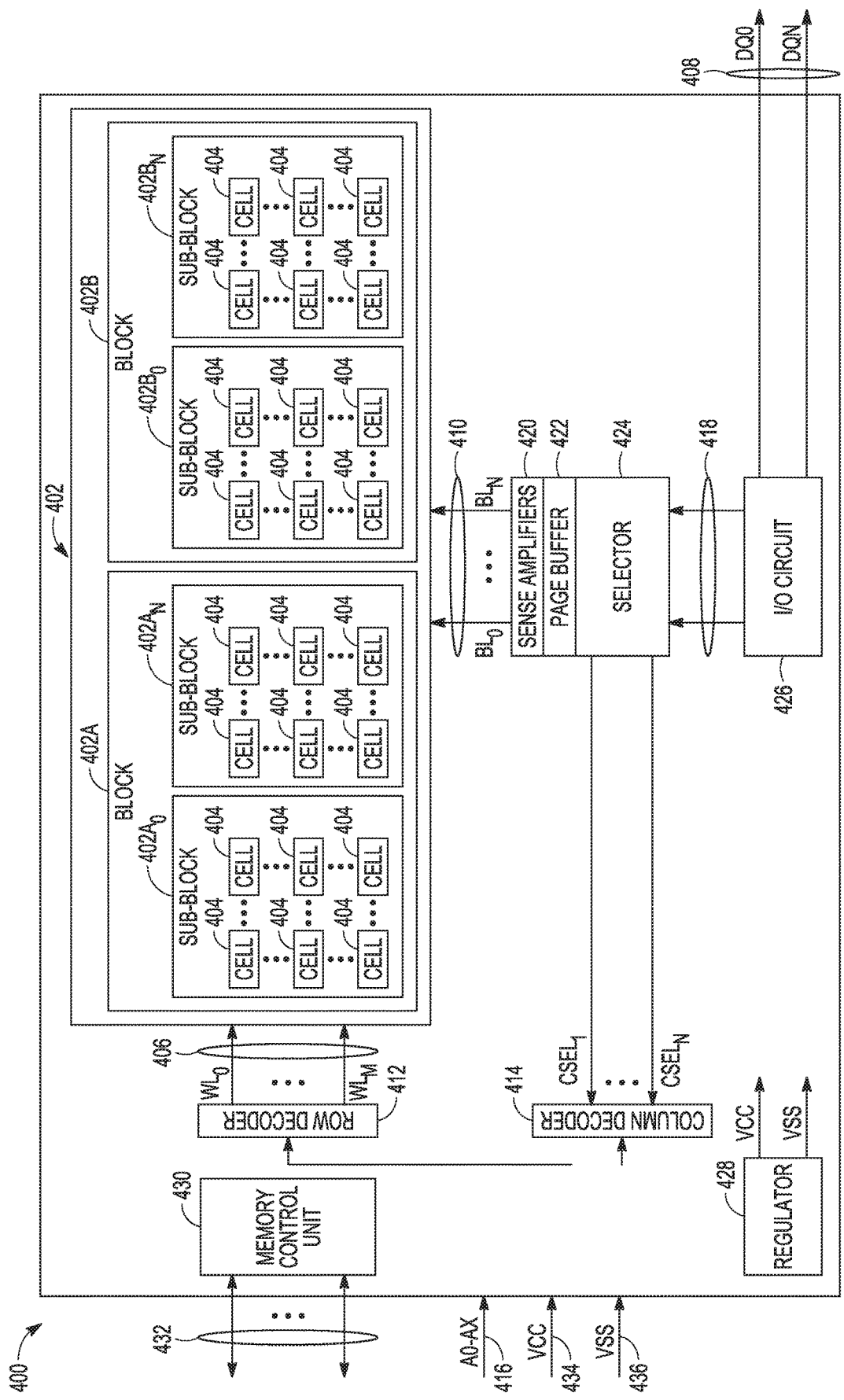
FIG. 4 illustrates an example block diagram of a memory module, according to various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks $402A_0$, $402A_n$, and the second block 402B can include first and second sub-blocks $402B_0$, $402B_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
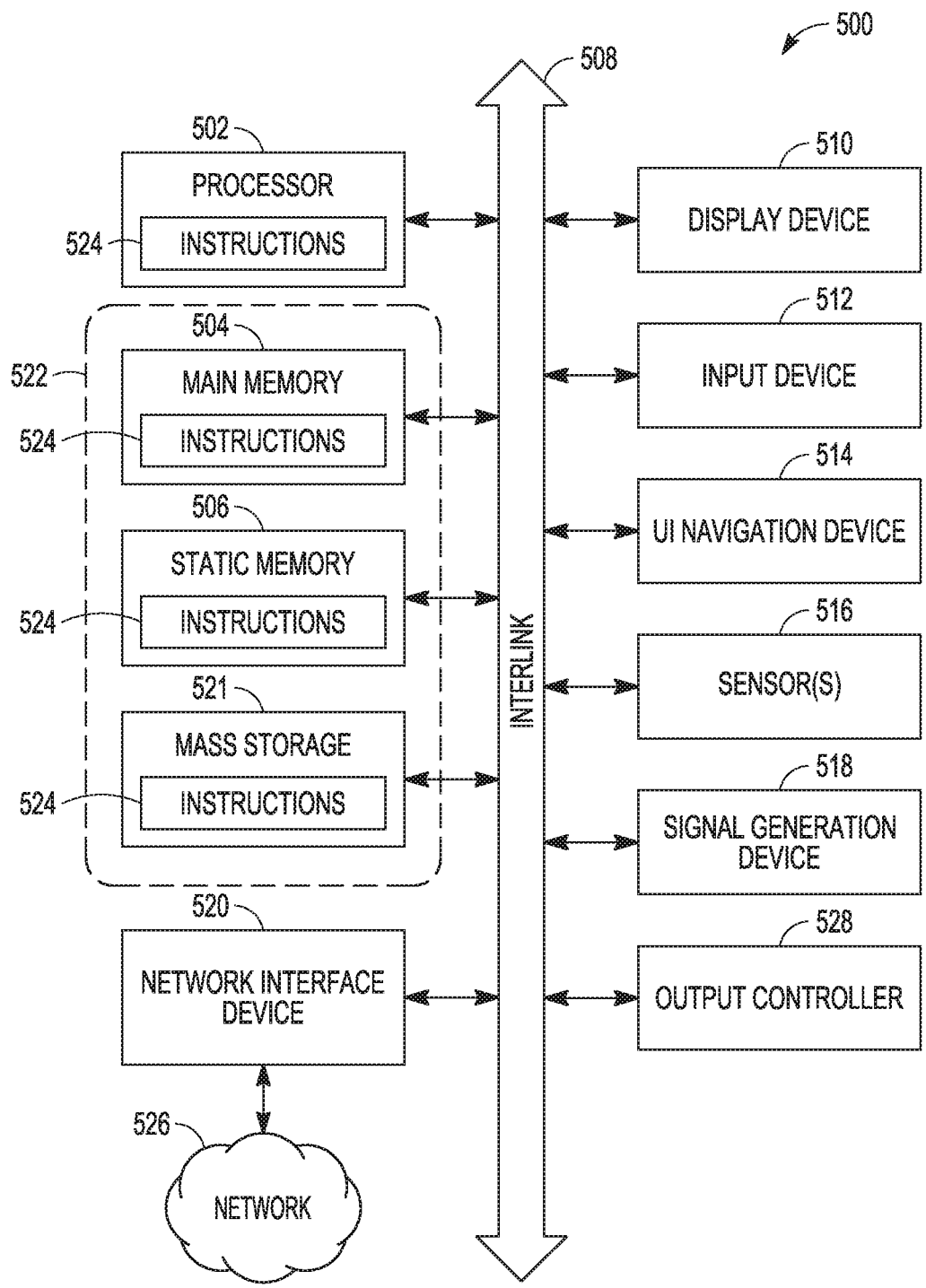
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (GPU), a hardware processor core, or any combination thereof, such as the memory controller 115, etc.), a main memory 504 and a static memory 506, some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine-readable medium 522.

While the machine-readable medium 522 is illustrated as a single medium, the term "machine-readable medium" may include a single medium or multiple media, (e.g., a centralized or distributed database, or associated caches and servers) configured to store the one or more instructions 524.

The term "machine-readable medium" ay include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage device 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®) IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques.

Figure 6:
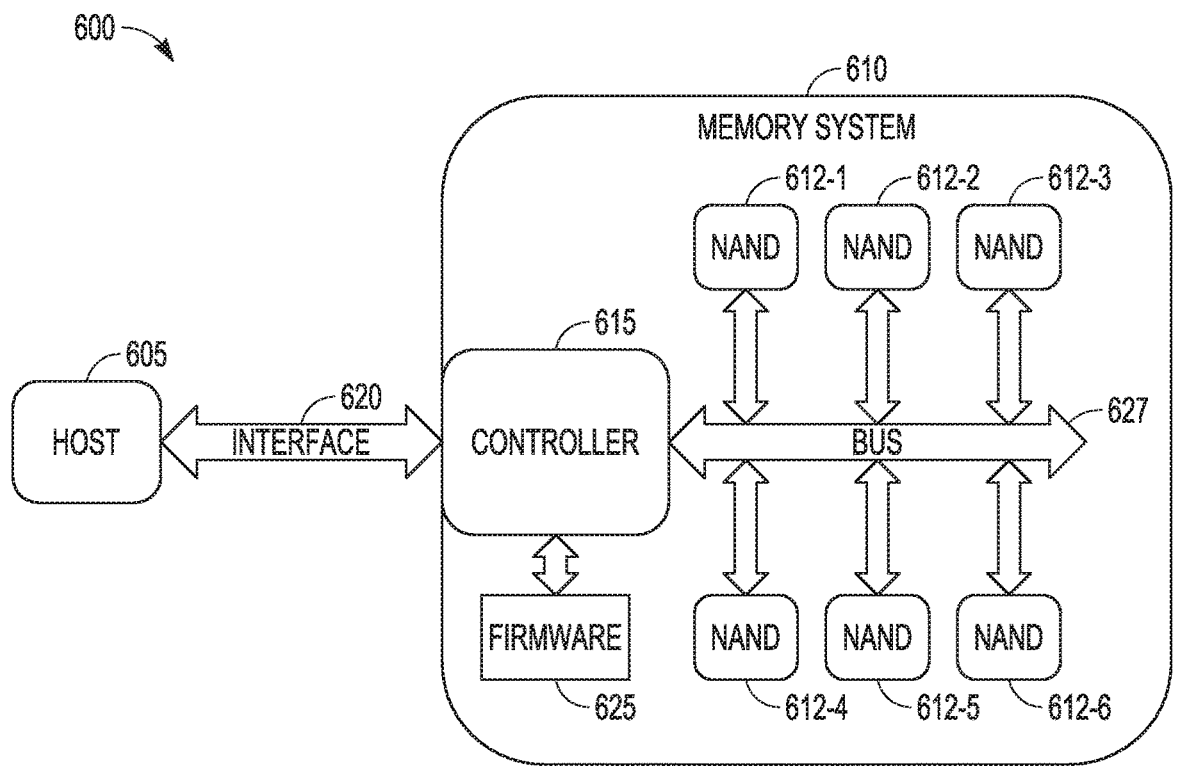
FIG. 6 is a block diagram of an example system comprising a host and a memory system operable to screen for defect prone blocks of memory in the memory system, according to various embodiments.

FIG. 6 is a block diagram of a system 600 comprising a host 605 and a memory system 610 operable to screen for defect prone blocks of memory in the memory system 610. The host 605 is coupled to the memory system 610 by an interface 620. The memory system 610 can include a controller 615 coupled to memory devices 612-1, 612-2, 612-3, 612-4, 612-5, and 612-6 by a bus 627. Though six memory devices are shown in FIG. 6, the memory system can be implemented with less or more than six memory devices, that is memory system 610 can comprise one or more memory devices. The controller 615 can include or be structured as one or more processors. The memory system 600 can comprise firmware 625 having code executable by the controller 615 to at least manage the memory devices 612-1, 612-2, 612-3, 612-4, 612-5, and 612-6. The firmware 625 can reside in a storage device of the memory system 610 coupled to the controller 615. The firmware 625 can be coupled to the controller 615 using the bus 627 or some other interface on the memory system 610. Alternatively, the firmware 625 can reside in the controller 6105 or can be distributed in the memory system 610 with firmware components, such as but not limited to code, including one or more components in the controller 615. The firmware 625 can include code having instructions, executable by the controller, to operate on the memory devices 612-1, 612-2, 612-3, 612-4, 612-5, and 612-6. The instructions can include instructions to execute algorithms to screen defective prone blocks using metrics for memory operations on the blocks of memory in the memory devices of the memory system 610, as taught herein.

The system 600 and its components can be structured in a number of different arrangements. For example, the system 600 can be arranged with a variation of the type of components that comprise the host 605, the interface 620, the memory system 610, the memory devices 612-1, 612-2, 612-3, 612-4, 612-5, and 612-6, the controller 615, and the bus 629. The host 605 can comprise one or more processors, which can vary in type. The interface 620 can be arranged as, but not limited to, a peripheral component interconnect express (PCIe) interface. The memory system 610 can be, but is not limited to, a SSD. The memory devices 612-1, 612-2, 612-3, 612-4, 612-5, and 612-6 can be NAND memory devices. The controller 615 can include or be structured as one or more types of processors compatible with the memory devices 612-1, 612-2, 612-3, 612-4, 612-5, and 612-6. The bus 627 can be an an open NAND flash interface (ONFI) bus for the memory devices 612-1, 612-2, 612-3, 612-4, 612-5, and 612-6 being NAND flash memory devices.

In various embodiments, the firmware 625 can have instructions, executable by the controller 615, to operate on a memory device of the memory devices 612-1, 612-2, 612-3, 612-4, 612-5, and 612-6, which can be extended to combinations of the memory devices, where the instructions can include operations to track a metric associated with a memory operation on a block of memory of the memory devices. The operations can include operations to generate a Z-score for the metric and compare the Z-score to a Z-score threshold for the metric. Based on the comparison, the operations can include operations to control retirement of the block of memory. Control of the retirement can include continuing operation of the memory to store user data in the block of memory, to retire the block of memory from all use, or to retire the block of memory for storage of user data directly accessible by the user and allocate the block of memory for internal memory device operations, which may be referred to as housing cleaning operations. The housing cleaning operations can include use in garbage collections, where user data is protected. Control of retirement can include limiting use of the block of memory to a less critical status than active storage of user data, where the less critical status can include having system blocks of memory in which there in not a significant amount of programming or recycles on the block of memory or where there are multiple copies of the data to be stored by the block of memory.

The metric can be a time to perform the memory operation on the block of memory and tracking the metric can be realized by measuring the time to perform the memory operation. Such measurements can be made by the controller 615, in conjunction with the firmware 625, since the controller 615 is involved directly with the memory operation to be performed by a memory device in response to a command from the host 605 and involved with the confirmation of completion of the memory operation to the host 605. With the time to perform the memory operation being the metric, the controller 615 can execute instructions in the firmware 625 to generate a Z-score for the measured time and use a threshold for Z-scores of time to perform the memory operation as the Z-score threshold for the metric.

The metric, realized as a time to perform the memory operation, can be a time to program a page on the block of memory, and the threshold for Z-scores can be a threshold for Z-scores of time to program a page of a block of memory. With the metric being the time to program a block of memory, the operations to control the retirement of the block can include operations to read the page in response to the Z-score being greater than the threshold for Z-scores of time to program a page of a block of memory and to determine a failed bit count in conducting the read. The read can be directed to only the page whose monitoring of its programming resulted in a determination that its associated Z-score exceeded the Z-score threshold. If the failed bit count is greater than a threshold for correctable error correcting code errors, valid data written in the block can be relocated to another block of memory and the block under consideration can be retired. This retirement may be a retirement of all uses of the block of memory or a retirement from use as a storage of user data with possible use in other operations of the memory device.

With the metric being a time to program a page on the block of memory, the operations to control the retirement of the block can include operations to read the page in response to the Z-score being greater than the threshold for Z-scores of time to program a page of a block of memory and to determine a failed bit count in conducting the read. The read can be directed to only the page whose monitoring of its programming resulted in a determination that its associated Z-score exceeded the Z-score threshold. If the failed bit count is less than a threshold for correctable error correcting code errors, operating the block of memory for user data can continue and statistics for use of Z-scores as parameters for screening of block of memories can be updated. Updating the statistics can include operations to calculate a mean value and a sigma value for the metric using the currently measured time to program the page and previous times to program pages, where the previous times are associated with the Z-score generated to evaluate the current measured time to program the block of memory. In this calculation, the current measured time to program the block of memory is another data point in a distribution of times to program a block of memory collected from previous measurements.

The metric, realized as a time to perform the memory operation, can be a time to erase a block of memory, and the threshold for Z-scores can be a threshold for Z-scores of time to erase a block of memory. With the metric being the time to erase a block of memory, the operations to control the retirement of the block can include operations to perform a block scan after the block is closed in response to the Z-score being greater than the threshold for Z-scores of time to erase a block of memory and to determine a failed bit count for each page of the block of memory from the block scan. In response to a determination that at least one failed count of the failed counts for the pages of the block of memory is greater than a threshold for correctable error correcting code errors, valid data of the block can be relocated to another block of memory, and the block of memory, under examination, can be retired. This retirement may be a retirement of all uses of the block of memory or a retirement from use as a storage of user data with possible use in other operations of the memory device.

With the metric being the time to erase a block of memory, the operations to control the retirement of the block can include operations to perform a block scan after the block is closed in response to the Z-score being greater than the threshold for Z-scores of time to erase a block of memory and to determine a failed bit count for each page of the block of memory from the block scan. In response to a determination that the failed bit count of each page is less than a threshold for correctable error correcting code errors, operating the block of memory for user data can continue and statistics for use of Z-scores as parameters for screening of block of memories can be updated. Updating the statistics can include operations to calculate a mean value and sigma value for the metric using the currently measured time to erase the block and previous times to erase blocks, where the previous times associated with the Z-score generated to evaluate the current measured time to erase the block of memory. In this calculation, the current measured time to program the block of memory is another data point in a distribution of times to erase a block of memory collected from previous measurements.

With the metric being the time to program a page of a block of memory, the operations to control the retirement of the block can include operations to continue programming the block in response to the Z-score for the current measured time to program a page being less than the threshold for Z-scores of time to program a page of a block of memory. With the metric being the time to erase a block of memory, the operations to control the retirement of the block can include operations to continue operating the block in response to the Z-score for the current measured time to erase the block being less than the threshold for Z-scores of time to erase a block of memory.

The firmware 625 can include instructions to track multiple metrics associated with memory operations on memory devices, such as memory devices 612-1 . . . 612-6. The multiple metrics can include a time to program a page of a memory block and a time to erase a memory block. The metrics can be tracked including combination of metrics.

Figure 7:
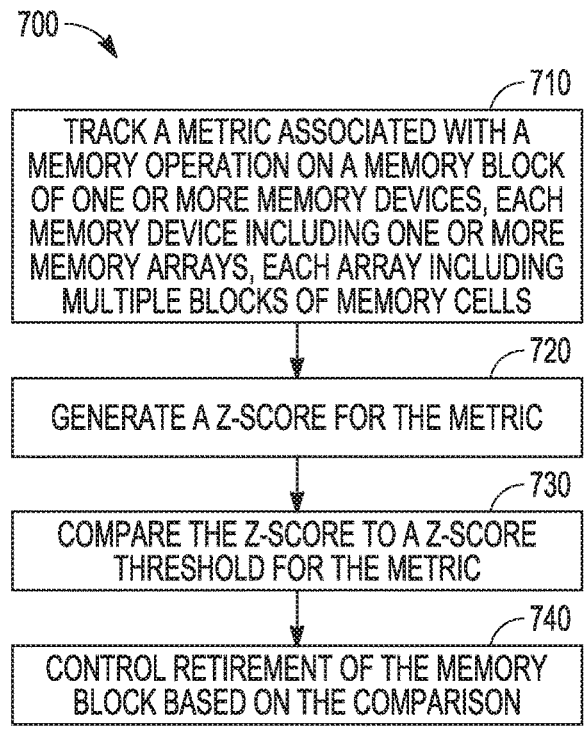
FIG. 7 is a flow diagram of features of an example method of using a metric associated with a memory operation on a memory block of a memory device to screen memory blocks of the memory device, according to various embodiments.

FIG. 7 is a flow diagram of features of an embodiment of an example method 700 of using a metric associated with a memory operation on a memory block of a memory device to screen memory blocks of the memory device. The method 700 can be performed via instructions in firmware for and executed by a controller of a memory system. The controller can be or can include one or more processors. The controller can be arranged as a memory controller for the memory device or for the memory device and other memory devices in the memory system. The method 700 or methods similar to the method 700 can be conducted with respect to blocks of memory of a memory device of a system associated with any of FIGS. 1-6.

At 710, a metric is tracked, where the metric is associated with a memory operation on a memory block of one or more memory devices, with each memory device including one or more memory arrays, where each memory array includes multiple blocks of memory cells. Tracking the metric can include measuring a time to perform the memory operation on the memory block. With the metric being a measured time, the Z-score for the metric can be a Z-score for the measured time and the Z-score threshold for the metric can be a threshold for Z-scores of time to perform the memory operation. The time to perform the memory operation can include a time to program a page of the memory block or a time to erase the memory block. Other metrics can be implemented, which can be combinations of metrics.

At 720, a Z-score for the metric is generated. At 730, the Z-score is compared to a Z-score threshold for the metric. At 740, retirement of the memory block is controlled based on the comparison.

Variations of the method 700 or methods similar to the method 700 can include a number of different embodiments that may be combined depending on the application of such methods and/or the architecture of systems in which such methods are implemented. Such methods can include, for the metric being a time to program a page of the memory block, controlling retirement of the memory block by reading the page in the memory block in response to the Z-score being greater than the threshold for Z-scores of time to program a page of a memory block and determining a failed bit count in conducting the reading. In response to the failed bit count being greater than a threshold for correctable error correcting code errors, valid data of the memory block is relocated from the memory block and the memory block is retired.

Variations of the method 700 or methods similar to the method 700 can include, for the metric being a time to program a page of the memory block, controlling retirement of the memory block to include reading the page in the memory block in response to the Z-score being greater than the threshold for Z-scores of time to program a page of a memory block and determining a failed bit count in conducting the reading. In response to the failed bit count being less than a threshold for correctable error correcting code errors, such methods can include calculating a mean value and a sigma value using the measured time to program the page and previous times to program pages. The previous times are associated with the Z-score for the measured time to program the page.

Variations of the method 700 or methods similar to the method 700 can include, for the metric being a time to erase the memory block, controlling retirement to include performing a block scan after the memory block is closed in response to the Z-score being greater than the threshold for Z-scores of time to erase a memory block and determining a failed bit count for each page of the memory block from the block scan. In response to a determination that at least one failed count is greater than a threshold for correctable error correcting code errors, valid data of the memory block can be relocated from the memory block and the memory block can be retired. Retiring the memory block can include removing the memory block from being a memory block to store user data.

Variations of the method 700 or methods similar to the method 700, for the metric being a time to erase the memory block, can include controlling retirement to include performing a block scan after the memory block is closed in response to the Z-score being greater than the threshold for Z-scores of time to erase a memory block and determining a failed bit count for each page of the memory block from the block scan. In response to the failed bit count of each page being less than a threshold for correctable error correcting code errors, a mean value and a sigma value can be calculated using the measured time to erase the block and previous times to erase blocks. The previous times are associated with the Z-score for the measured time to erase the memory block.

Figure 8:
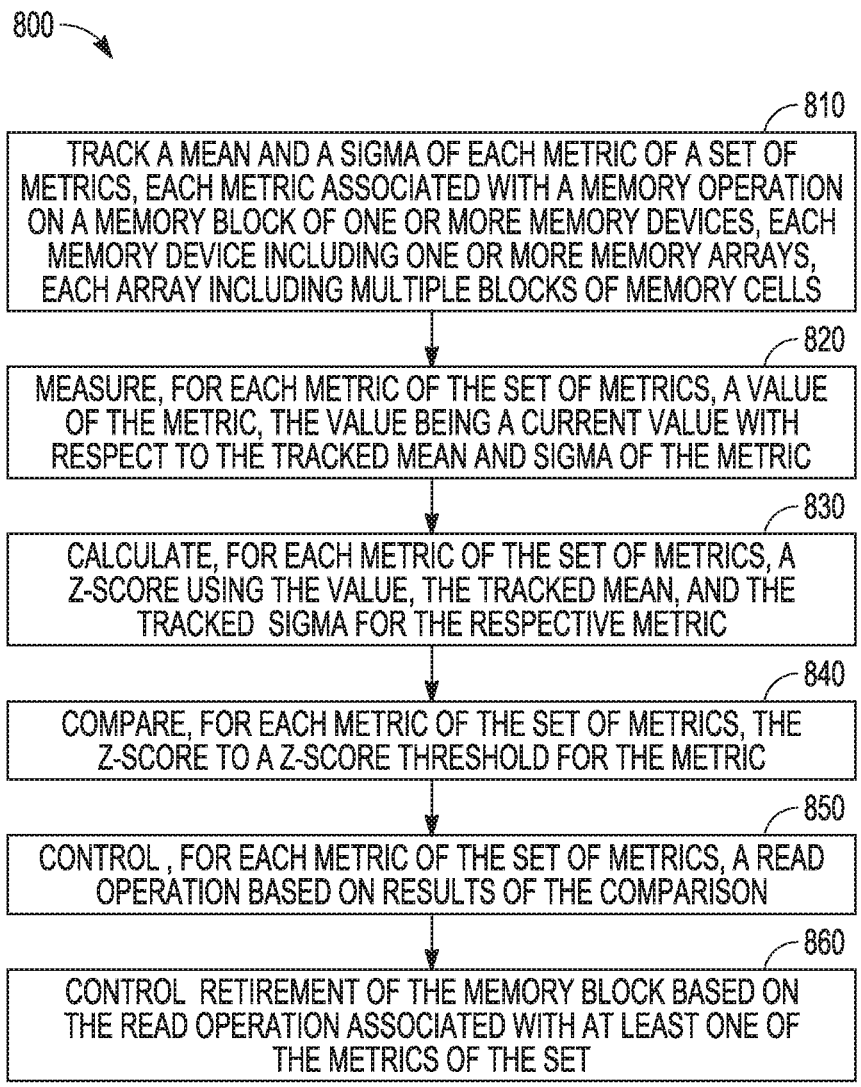
FIG. 8 is a flow diagram of features of an example method of using a set of metrics associated with memory operations on a memory block of a memory device to screen memory blocks of the memory device, according to various embodiments.

FIG. 8 is a flow diagram of features of an embodiment of an example method 800 of using a set of metrics associated with memory operations on a memory block of a memory device to screen memory blocks of the memory device. The method 800 can be performed via instructions in firmware for and executed by a controller of a memory system. The controller can be or can include one or more processors. The controller can be arranged as a memory controller for the memory device or for the memory device and other memory devices in the memory system. The method 800 or methods similar to the method 800 can be conducted with respect to blocks of memory of a memory device of a system associated with any of FIGS. 1-6.

At 810, a mean and a sigma of each metric of a set of metrics is tracked, where each metric is associated with a memory operation on a memory block of one or more memory devices. Each memory device included one or more memory arrays, with each array including multiple blocks of memory cells. The set of metrics can include a time to erase a memory block of a memory device and a time to program a page of a memory block. Other metrics or combinations of metrics can be used. The set of metrics can be based on a block type of the memory block.

At 820, for each metric of the set of metrics, a value of the metric is measured, where the value is a current value with respect to the tracked mean and sigma of the metric. The values of the mean and sigma of each metric of the set can be independent from other metrics of the set. At 830, for each metric of the set of metrics, a Z-score is calculated using the value, the tracked mean, and the tracked sigma for the respective metric. At 840, for each metric of the set of metrics, the Z-score is compared to a Z-score threshold for the metric. At 850, for each metric of the set of metrics, a read operation is controlled based on results of the comparison. At 860, retirement of the memory block is controlled based on the read operation associated with at least one of the metrics of the set.

Variations of the method 800 or methods similar to the method 800 can include a number of different embodiments that may be combined depending on the application of such methods and/or the architecture of systems in which such methods are implemented. Such methods can include calculating a new mean and a new sigma, associated with at least one of the metrics of the set, using the value in addition to values that generated the tracked mean and the tracked sigma, based on the read operation.

Firmware can comprise instructions, such as a microcode, which when executed by a controller or a processor, can cause performance of operations comprising operations associated with multiple block erase operations of a memory device of a memory system coupled to a host as associated with any of the FIGS. 1-6, the methods 700 and 800, methods similar to the methods 700 and 800, other methods, and associated device structures and data structures as taught herein.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.).

According to one or more embodiments, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The following are example embodiments of systems and methods, in accordance with the teachings herein.

An example system 1 can comprise: a controller; one or more memory devices, each memory device including one or more memory arrays, each memory array including multiple blocks of memory, each block of memory arranged as a block of memory cells; and firmware having stored instructions, executable by the controller, to operate on the one or more memory devices, the instructions including operations to: track a metric associated with a memory operation on a block of memory of the one or more memory devices; generate a Z-score for the metric; compare the Z-score to a Z-score threshold for the metric; and control retirement of the block of memory based on the comparison.

An example system 2 can include features of example system 1 and can include the operations to track the metric being operations to measure a time to perform the memory operation on the block of memory, the Z-score for the metric is a Z-score for the measured time, and the Z-score threshold for the metric is a threshold for Z-scores of me to perform the memory operation.

An example system 3 can include features of any of the preceding example systems and can include the time to perform the memory operation being a time to program a page of the block of memory and the threshold for Z-scores is a threshold for Z-scores of time to program a page of a block of memory.

An example system 4 can include features of any of the preceding example systems and can include the operations to control the retirement of the block of memory to include operations to: read the page in response to the Z-score being greater than the threshold for Z-scores of time to program a page of a block of memory; determine a failed bit count in conducting the read; and relocate valid data written in the block of memory and retire the block of memory in response to the failed bit count being greater than a threshold for correctable error correcting code errors.

An example system 5 can include features of any of the preceding example systems and can include the operations to control the retirement of the block of memory to include operations to: read the page in response to the Z-score for the time to program the page being greater than the threshold for Z-scores of time to program a page of a block of memory; determine a failed bit count in conducting the read; and calculate, in response to the failed bit count being less than a threshold for correctable error correcting code errors, a mean value and a sigma value using the measured time to program the page and previous times to program pages, the previous times associated with the Z-score.

An example system 6 can include features of any of the preceding example systems and can include the operations to control the retirement of the block of memory to include operations to continue programming the block of memory in response to the Z-score being greater than the threshold for Z-scores of time to program a page of a block of memory.

An example system 7 can include features of any of the preceding example systems and can include the time to perform the memory operation to be a time to erase the block of memory and the threshold for Z-scores is a threshold for Z-scores of time to erase a block of memory.

An example system 8 can include features of any of the preceding example systems and can include the operations to control the retirement of the block of memory to include operations to: perform a block scan after the block of memory is closed in response to the Z-score being greater than the threshold for Z-scores of time to erase a block of memory; determine a failed bit count for each page of the block of memory from the block scan; and relocate valid data of the block of memory and retire the block of memory as a user data storage block in response to a determination that at least one failed count is greater than a threshold for correctable error correcting code errors.

An example system 9 can include features of any of the preceding example systems and can include the operations to control the retirement of the block of memory to include operations to: perform a block scan after the block of memory is closed in response to the Z-score being greater than the threshold for Z-scores of time to erase a block of memory; determine a failed bit count for each page of the block of memory from the block scan; and calculate, in response to the failed bit count of each page being less than a threshold for correctable error correcting code errors, a mean value and sigma value using the measured time to erase the block of memory and previous times to erase blocks of memory, the previous times associated with the Z-score.

An example method 1 can comprise: tracking a metric associated with a memory operation on a memory block of one or more memory devices, each memory device including one or more memory arrays, each memory array including multiple memory blocks, each memory block arranged as a block of memory cells; generating a Z-score for the metric; comparing the Z-score to a Z-score threshold for the metric; and controlling retirement of the memory block based on the comparison.

An example method 2 can include features of example method 1 and can include tracking the metric to include measuring a time to perform the memory operation on the memory block, the Z-score for the metric is a Z-score for the measured time, and the Z-score threshold for the metric is a threshold for Z-scores of time to perform the memory operation.

An example method 3 can include features of any of the preceding example methods and can include the time to perform the memory operation to include a time to program a page of the memory block or a time to erase the memory block.

An example method 4 can include features of any of the preceding example methods and can include controlling retirement to include: reading the page in the memory block in response to the Z-score being greater than the threshold for Z-scores of time to program a page of a memory block; determining a failed bit count in conducting the reading; and relocating valid data of the memory block and retiring the memory block in response to the failed bit count being greater than a threshold for correctable error correcting code errors.

An example method 5 can include features of any of the preceding example methods and can include controlling retirement to include: reading the page in the memory block in response to the Z-score being greater than the threshold for Z-scores of time to program a page of a memory block; determining a failed bit count in conducting the reading; and calculating, in response to the failed bit count being less than a threshold for correctable error correcting code errors, a mean value and a sigma value using the measured time to program the page and previous times to program pages, the previous times associated with the Z-score for the measured time to program the page.

An example method 6 can include features of any of the preceding example methods and can include controlling retirement to include: performing a block scan after the memory block is closed in response to a Z-score being greater than the threshold for Z-scores of time to erase a memory block; determining a failed bit count for each page of the memory block from the block scan; and relocating valid data of the memory block and retiring the memory block as a user data in response to a determination that at least one failed count is greater than a threshold for correctable error correcting code errors.

An example method 7 can include features of any of the preceding example methods and can include controlling retirement to include: performing a block scan after the memory block is closed in response to a Z-score being greater than the threshold for Z-scores of time to erase a memory block; determining a failed bit count for each page of the memory block from the block scan; and calculating, in response to the failed bit count of each being less than a threshold for correctable error correcting code errors, a mean value and a sigma value using the measured time to erase the block and previous times to erase blocks, the previous times associated with the Z-score for the measured time to erase the memory block.

An example method 8 can comprise: tracking a mean and a sigma of each metric of a set of metrics, each metric associated with a memory operation on a memory block of one or more memory devices, each memory device including one or more memory arrays, each memory array including multiple memory blocks, each memory block arranged as a block of memory cells; for each metric of the set of metrics: measuring a value of the metric, the value being a current value with respect to the tracked mean and sigma of the metric; calculating a Z-score using the value, the tracked mean, and the tracked sigma for the respective metric; comparing the Z-score to a Z-score threshold for the metric; and controlling a read operation based on results of the comparison; and controlling retirement of the memory block based on the read operation associated with at least one of the metrics of the set.

An example method 9 can include features of example method 8 and can include calculating a new mean and a new sigma, associated with at least one of the metrics of the set, using the value in addition to values that generated the tracked mean and the tracked sigma, based on the read operation.

An example method 10 can include features of any of the preceding example methods 8 and 9 and can include values of the mean and sigma of each metric of the set being independent from other metrics of the set.

An example method 11 can include features of any of the preceding example methods 8-10 and can include the set of metrics to include a time to erase a memory block of a memory device and a time to program a page of a memory block.

An example method 12 can include features of any of the preceding example methods 8-11 and can include the set of metrics being based on a block type of the memory block.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Thus, the following claims are hereby incorporated into the Detailed Description, with each claim standing on its own as a separate embodiment.

What is claimed is:

1. A system comprising:
a controller;
one or more memory devices, each memory device including one or more memory arrays, each memory array including multiple blocks of memory, each block of memory arranged as a block of memory cells; and
firmware having stored instructions, executable by the controller, to operate on the one or more memory devices, the instructions including operations to:
track a metric associated with a memory operation on a block of memory of the one or more memory devices;
generate a Z-score for the metric;
compare the Z-score to a Z-score threshold for the metric; and
control retirement of the block of memory based on the comparison, with the control of retirement including an evaluation regarding retirement of the block of memory for storage of user data directly accessible by the user, with allocation of the block of memory to one or more internal housing cleaning operations.

2. The system of claim 1, wherein the operations to track the metric are operations to measure a time to perform the memory operation on the block of memory, the Z-score for the metric is a Z-score for the measured time, and the Z-score threshold for the metric is a threshold for Z-scores of time to perform the memory operation.

3. The system of claim 2, wherein the time to perform the memory operation is a time to program a page of the block of memory and the threshold for Z-scores is a threshold for Z-scores of time to program a page of a block of memory.

4. The system of claim 3, wherein the operations to control the retirement of the block of memory include operations to:
read the page in response to the Z-score being greater than the threshold for Z-scores of time to program a page of a block of memory;
determine a failed bit count in conducting the read; and
relocate valid data written in the block and retire the block of memory in response to the failed bit count, being greater than a threshold for correctable error correcting code errors.

5. The system of claim 3, wherein the operations to control e retirement of the block of memory include operations to:
read the page in response to the Z-score for the time to program the page being greater than the threshold for Z-scores of time to program a page of a block of memory;
determine a failed bit count in conducting the read; and
calculate, in response to the failed bit count being less than a threshold for correctable error correcting code errors, a mean value and a sigma value using the measured time to program the page and previous times to program pages, the previous times associated with the Z-score.

6. The system of claim 3, wherein the operations to control the retirement of the block of memory include operations to continue programming the block of memory in response to the Z-score being greater than the threshold for Z-scores of time to program a page of a block of memory.

7. The system of claim 2, wherein the time to perform the memory operation is a time to erase the block of memory and the threshold for Z-scores is a threshold for Z-scores of time to erase a block of memory.

8. The system of claim 7, wherein the operations to control the retirement of the block of memory include operations to:
perform a block scan after the block of memory is closed in response to the Z-score being greater than the threshold for Z-scores of time to erase a block of memory;
determine a failed bit count for each page of the block of memory from the block scan; and
relocate valid data of the block of memory and retire the block of memory as a user data storage block in response to a determination that at, least one failed count is greater than a threshold for correctable error correcting code errors.

9. The system of claim 7, wherein the operations to control the retirement of the block of memory include operations to:
perform a block scan after the block of memory is closed in response to the Z-score being greater than the threshold for Z-scores of time to erase a block of memory;
determine a failed bit count for each page of the block of memory from the block scan; and
calculate, in response to the failed bit count of each page being less than a threshold for correctable error correcting code errors, a mean value and sigma value using the measured time to erase the block of memory and previous times to erase blocks of memory, the previous times associated with the Z-score.

10. A method comprising:
tracking a metric associated with a memory operation on a memory block of one or more memory devices, each memory device including one or more memory arrays, each memory array including multiple memory blocks, each memory block arranged as a block of memory cells;
generating a Z-score for the metric;
comparing the Z-score to a Z-score threshold for the metric; and
controlling retirement of the memory block based on the comparison, with controlling retirement including evaluating retirement of the block of memory for storage of user data directly accessible by the user, with allocation of the block of memory to one or more internal housing cleaning operations.

11. The method of claim 10, wherein tracking the metric includes measuring a time to perforin the memory operation on the memory block, the Z-score for the metric is a Z-score for the measured time, and the Z-score threshold for the metric is a threshold for Z-scores of time to perform the memory operation.

12. The method of claim 11, wherein the time to perform the memory operation includes a time to program a page of the memory block or a time to erase the memory block.

13. The method of claim 12, wherein controlling retirement includes:
reading the page in the memory block in response to the Z-score being greater than the threshold for Z-scores of time to program a page of a memory block;
determining a failed bit count in conducting the reading; and
relocating valid data of the memory block and retiring the memory block in response to the failed bit count being greater than a threshold for correctable error correcting code errors.

14. The method of claim 12, wherein controlling retirement includes:
reading the page in the memory block in response to the Z-score being greater than the threshold for Z-scores of time to program a page of a memory block;
determining a failed bit count in conducting the reading; and
calculating, in response to the failed bit count being less than a threshold for correctable error correcting code errors, a mean value and a sigma value using the measured time to program the page and previous times to program pages, the previous times associated with the Z-score for the measured time to program the page.

15. The method of claim 12, wherein controlling retirement includes:
performing a block scan after the memory block is closed in response to the Z-score being greater than a threshold for Z-scores of time to erase a memory block;
determining a failed bit count for each page of the memory block from the block scan; and
relocating valid data of the memory block and retiring the memory block as a user data in response to a determination that at least one failed count is greater than a threshold for correctable error correcting code errors.

16. The method of claim 12, wherein controlling retirement includes:
performing a block scan after the memory block is closed in response to the Z-score being greater than a threshold for Z-scores of time to erase a memory block;
determining a failed bit count for each page of the memory block from the block scan; and calculating, in response to the failed bit count of each being less than a threshold for correctable error correcting code errors, a mean value and a sigma value using the measured time to erase the block and previous times to erase blocks, the previous times associated with the Z-score for the measured time to erase the memory block.

17. A method comprising:

tracking a mean and a sigma of each metric of a set of metrics, each metric associated with a memory operation on a memory block of one or more memory devices, each memory device including one or more memory arrays, each memory array including multiple memory blocks, each memory block arranged as a block of memory cells;

for each metric of the set of metrics:
measuring a value of the metric, the value being a current value with respect to the tracked mean and sigma of the metric;
calculating a Z-score using the value, the tracked mean, and the tracked sigma for the respective metric;
comparing the Z-score to a Z-score threshold for the metric; and
controlling a read operation based on results of the comparison; and
controlling retirement of the memory block based on the read operation associated with at least one of the metrics of the set, with controlling retirement including evaluating retirement of the block of memory for storage of user data directly accessible by the user, with allocation of the block of memory to one or more internal housing cleaning operations.

18. The method of claim 17, wherein the method includes calculating a new mean and a new sigma, associated with at, least one of the metrics of the set, using the value in addition to values that generated the tracked mean and the tracked sigma, based on the read operation.

19. The method of claim 17, wherein values of the mean and sigma of each metric of the set are independent from other metrics of the set.

20. The method of claim 17, wherein the set of metrics includes a time to erase a memory block of a memory device and a time to program a page of a memory block.

21. The method of claim 17, wherein the set of metrics are based on a block type of the memory block.

* * * * *